United States Patent [19]

Schmidt

[11] 4,435,980

[45] Mar. 13, 1984

[54] PIPE-MOUNTED VALVE-TYPE FLOW METER

[75] Inventor: Ulrich Schmidt, Lahn-Steindorf, Fed. Rep. of Germany

[73] Assignee: Firma Rötelmann & Co., Werdohl, Fed. Rep. of Germany

[21] Appl. No.: 389,971

[22] Filed: Jun. 18, 1982

[30] Foreign Application Priority Data

Jan. 12, 1982 [DE] Fed. Rep. of Germany ....... 3200587

[51] Int. Cl.³ ............................................ G01F 15/02
[52] U.S. Cl. .................................................... 73/198
[58] Field of Search ..................... 73/198, 861.74, 861, 73/756, 863.85; 137/559, 560; 374/142

[56] References Cited

U.S. PATENT DOCUMENTS 3,352,155 11/1967 Penet ...................................... 73/198
3,477,289 11/1969 Wiebe ............................... 73/198 X

*Primary Examiner*—Jerry W. Myracle
*Attorney, Agent, or Firm*—Karl F. Ross

[57] ABSTRACT

A apparatus for measuring at least one parameter of a fluid flowing between two conduit sections has a housing connected between the sections and having a throughgoing main passage communicating therebetween and an externally open branch passage extending from the main passage between the sections. The housing is formed at the junction of the main and branch passages with a valve seat. A valve body on the seat is formed with a throughgoing and at least generally T-shaped valve passage having a pair of arm sections alignable with the main passage and a leg section aligned with the branch passage. The body is displaceable relative to the main passage at the seat between a flow position in which the valve passage is aligned with the main passage and the fluid can flow through the main passage between the sections and a blocking position in which the valve passage is not aligned with the main passage and fluid cannot flow through the main passage between the sections. The valve seat seals the valve passage from the main passage in the blocking position. A sensor for the one parameter extends through the branch passage into the valve passage. This sensor is releasably secured to the housing and the branch passage is externally sealed.

20 Claims, 6 Drawing Figures

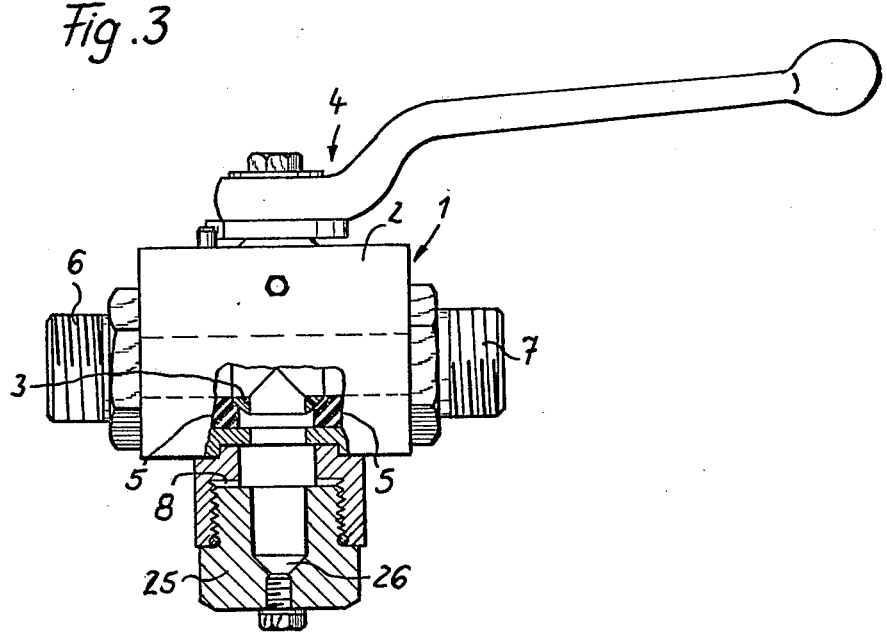
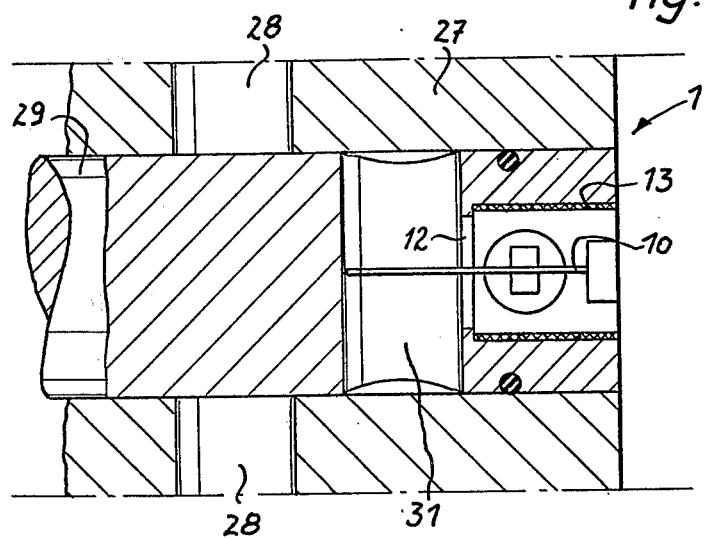
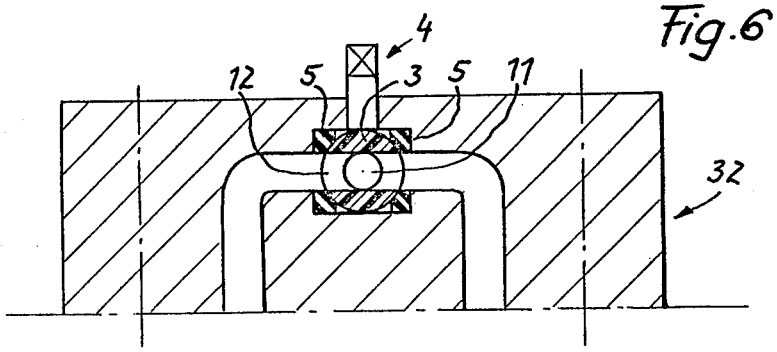

PIPE-MOUNTED VALVE-TYPE FLOW METER

FIELD OF THE INVENTION

The present invention relates to a pipe-mounted flow meter, temperature sensor, pressure meter, or the like. More particularly this invention concerns such a device which can be permanently mounted between a pair of conduit selections between which a fluid flows.

BACKGROUND OF THE INVENTION

It is necessary in many industrial processes to be able to monitor temperature, pressure, volume and/or speed of a fluid flowing in a pipe at a multiplicity of locations. In some situations the sensors are connected permanently to a central control room, and in others the probes of the sensors remain in place at the monitoring locations, but are only connected periodically to some device capable of reading them, as when there has been a problem and it is being traced. To this end the meter is provided with a jack into which a plug of a portable reader can be inserted to make the required readings.

Such a meter is normally mounted as a fitting right in the line having the flow to be monitored. The meter therefore has a housing and is formed with a main passage that constitutes a continuation of the conduit sections to both sides of it, and also has a lateral branch passage by means of which the appropriate sensor is mounted for exposure to the fluid in the main passage.

Flow or volume measurement particularly requires the provision right in the stream of a probe element which is deflected by the flow. Such a device might be a Woltmann-type fan which is rotated by the flow, or a bendable element whose magnetic field is detected. These devices therefore obviously create a service problem, as they are exposed to foreign matter, the caustic or acidic phase of the fluid, and so on.

Thus it is necessary to service these devices at least occasionally. Such work requires that the line they are in be shut down and, usually, drained. Once the servicing is complete, it is necessary to bleed the line in most cases also. As a result it is standard practice to replace all of the delicate sensor elements at one time to avoid having to drain the line too often, even though replacement of the works of such a meter is usually a relatively simple and rapid task.

Furthermore, such flowmeters are normally combined with other sensors, such as temperature meters and pressure meters. In case of failure of any of these parts it is therefore also necessary to shut down and drain the line. It has been suggested to avoid this problem by providing such devices in a separate branch line that can be isolated from the main line during servicing, but such a system cannot work for a flow meter which must be right in the main line, and merely adds to the overall cost and complexity of the monitoring device.

OBJECTS OF THE INVENTION

It is therefore an object of the present invention to provide an improved apparatus for measuring at least one parameter of a fluid in a conduit.

Another object is the provision of such an apparatus which overcomes the above-given disadvantages.

A further object is to provide a flowmeter which may be combined with temperature and/or pressure sensors and that can be serviced without having to drain and bleed the line and with minimal interruption of the process in which the line takes part.

SUMMARY OF THE INVENTION

These objects are attained according to the instant invention in aAn apparatus for measuring at least one parameter of a fluid flowing between two conduit sections. The apparatus has a housing connected between the sections and having a throughgoing main passage communicating therebetween and an externally open branch passage extending from the main passage between the sections. The housing is formed at the junction of the main branch passages with a valve seat. A valve body on the seat is formed with a throughgoing and at least generally T-shaped valve passage having a pair of arm sections alignable with the main passage and a leg section aligned with the branch passage. Means is provided for displacing the body relative to the main passage at the seat between a flow position in which the valve passage is aligned with the main passage and the fluid can flow through the main passage between the sections and a blocking position in which the valve passage is not aligned with the main passage and fluid cannot flow through the main passage between the sections. The valve seat seals the valve passage from the main passage in the blocking position. A sensor for the one parameter extends through the branch passage into the valve passage. Means is provided for releasably securing the sensor to the housing and for externally sealing the branch passage.

Thus with the system of this invention it is merely necessary to turn the valve body into the blocking position to service the sensors. This action completely isolates the valve passage so the conduit sections need not be drained. Once in the blocking position the various sensors can be replaced or serviced with ease, then the valve body is moved back into the flow position and the system is ready to operate again. In fact the system according to this invention can simply be used in place of the standard cocks or shutoff valves that must be provided in conduits under any circumstances. It is possible to produce a cutoff valve suitable to receive the sensors according to this invention at a cost hardly different from that of a standard cutoff valve.

More specifically according to another feature of this invention the apparatus has a plug releasably securable to the housing over the branch passage to block same. This plug can be inserted after removal of the sensor parts to allow flow through the apparatus to be restored while they are serviced. The sensors can even be retired from service completely without having to take the entire device out of the line. Thus a cutoff valve provided with the valve body and plug according to this invention can be converted to a sensor arrangement very easily.

The main passage and arm sections of the valve passage according to this invention are straight, aligned, and of substantially the same inside diameter. Thus in the flow position the valve body presents virtually no restriction to flow through the housing.

Normally the sensor of the present invention has a tip lying at the junction of the arm and leg sections and aligned with the main passage in the flow position of the valve body. The tip is deflectable by flow over it between the conduit sections. Such a tip can be deflectable in a direction parallel to the main passage by flow through the arm sections. In this case the sensor includes means for detecting the extent of deflection of the tip by the flow for determining the rate or volume of flow through the valve body.

The tip according to this invention can also be a fan-type rotor rotatably deflectable about a fan axis aligned with the main passage. In this case the sensor includes means for detecting the rotation rate of the rotor for determining the rate or volume of flow through the valve body.

In either case the sensor of this invention has a sensor body held by the securing means to the housing. Its tip projects from the sensor body and is deflectable by flow through the main passage and arm sections.

According to another feature of this invention the sensor body has a protective sleeve displaceable between an extended position surrounding and protecting the tip and a retracted position exposing the tip and biasing means for urging the sleeve into the extended position. The sleeve is forced into the retracted position when the sensor body is held by the securing means to the housing. This sleeve is slidable in the sensor body and the biasing means is a spring braced between the sleeve and the sensor body. Normally also the sleeve has a formation extending in the direction of displacement of the sleeve and the housing is provided with another formation engageable with the formation of the sleeve only in a single angular orientation of the tip relative to the main passage. More specifically the formation of the sleeve is a groove and the formation of the housing is a pin engageable in the groove. This type of arrangement therefore insures that the delicate sensor is protected until it is mounted in place, and the act of assembling the system itself exposes the sensor. Simultaneously this arrangement insures proper orientation of the wire-like sensor.

In addition it is advisable according for this invention to form the sensor body with a small-diameter externally open bleed line which can be closed by a screw. This bleed line can be used to relieve pressure in the system in the blocking position when it is to be opened, and can also be used to refill the arrangemnt before it is returned to service.

According to another feature of this invention the sensor body is provided with a seat and is formed with an auxiliary passage extending between the seat and the valve passage. This makes it possible for the apparatus to have another sensor secured to the sensor body in the seat. This other sensor can be a pressure or temperature meter.

It is possible according to this invention for the valve body to be slidable between the flow and blocking positions. Another feature of this invention is ball-type construction of the valve body, that is the valve body and seat are complementarily formed and are centered on a transverse axis transverse to the main passage. Thus the body is pivotal about the transverse axis between the flow and blocking positions. This transverse axis is generally perpendicular to the main passage and the branch passage is at least generally centered on the transverse axis.

The securing means includes a screwthread on the housing. More particlarly this means includes a nut engageable with the screwthread and with the sensor. Thus the system is solidly held together.

DESCRIPTION OF THE DRAWING

The above and other features and advantages will become more readily apparent from the following, reference being made to the accompanying drawing in which:

FIG. 3 is a small-scale partly sectional view like FIG. 1 and showing the valve of FIG. 1 in another configuration;

FIGS. 5 and 6 are sections through two further valves according to the present invention.

SPECIFIC DESCRIPTION

Figure 1:
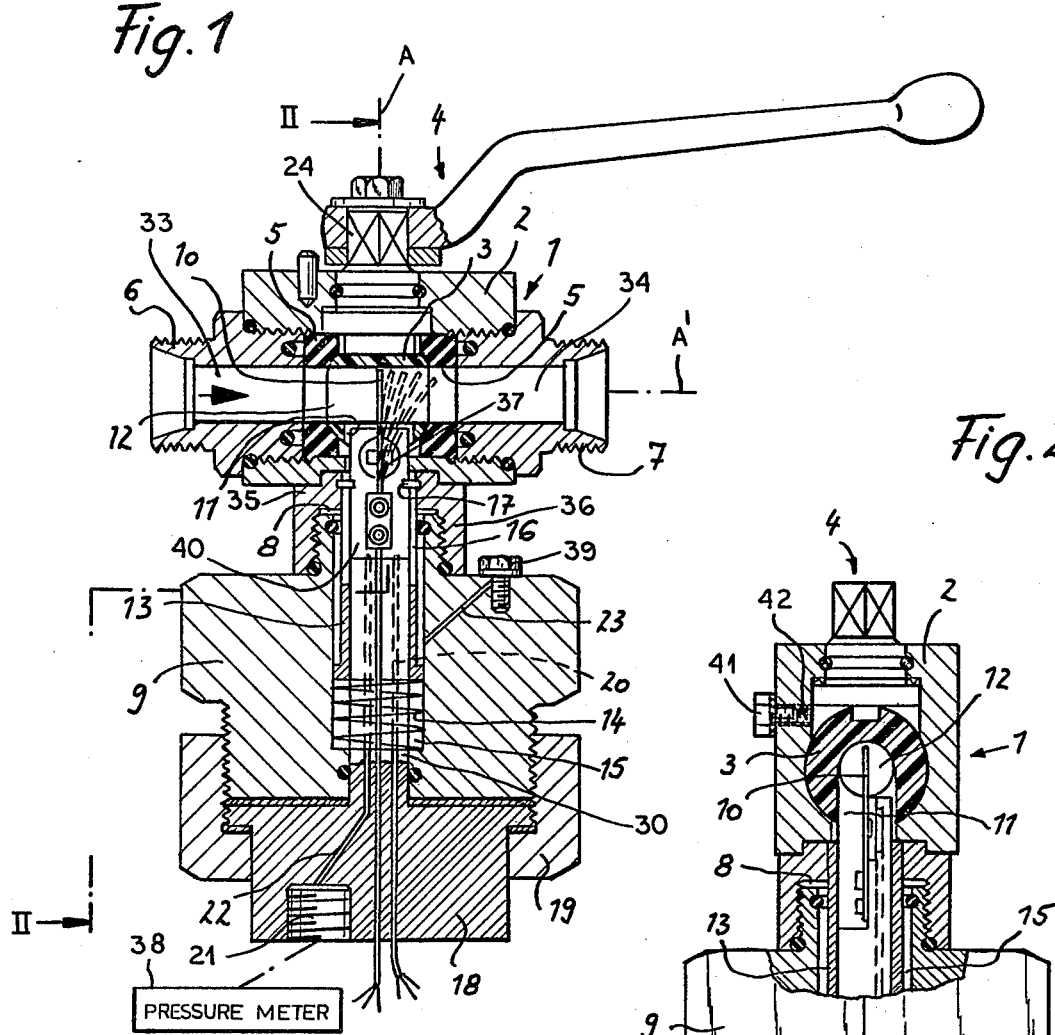
FIG. 1 is an axial section through an apparatus according to this invention.
Figure 2:
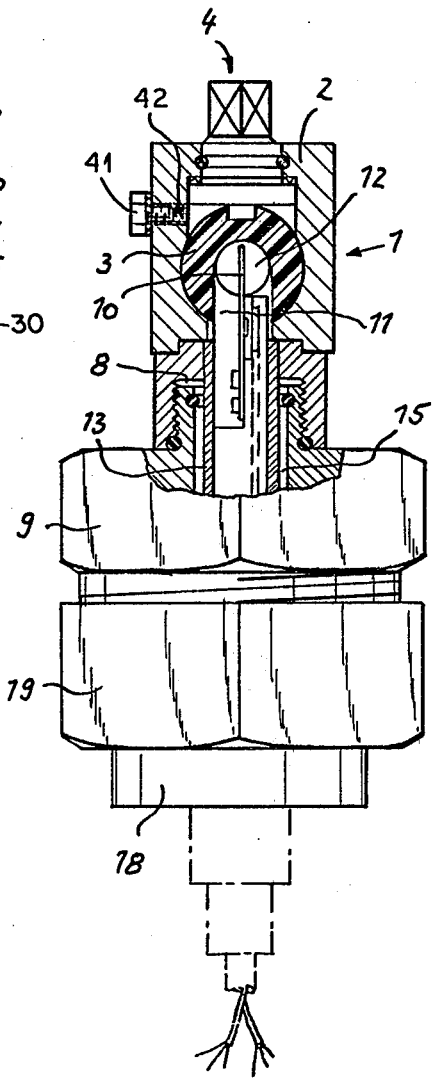
FIG. 2 is a partly sectional view taken along line II—II of FIG. 1.

As seen in FIGS. 1–3 an apparatus 1 according to this invention has a valve-type housing 2 having an inlet connection 6 centered on an upstream cylindrical inlet passage 33 and an outlet connection 7 centered on a downstream outlet passage 34 centered with the passage 33 on an axis A'. Between these two passages 33 and 34 the housing 2 has a seat-forming body 5 in which a ball-type valve body 3 can be rotated about an axis A perpendicular to the axis A' by an operating element or handle 4. A stem 24 on the valve body 3 extends through a seal in the housing 2 to the handle 4. The valve body 5 is formed with a cylindrical throughgoing valve passage 12 of the same diameter as the passages 33 and 34 and alignable with the axis A', so that in the flow position of FIG. 1 the valve according to this invention does not constitute any appreciable restriction to flow. In addition the valve body 3, here shaped as a body of revolution centered on the axis A, is formed with a branch passsage 11 also centered on the axis A and opening into the passage 12.

The housing 2 is provided with an extension 35 formed with an internally threaded seat 8 into which is screwed an extension 36 of a sensor body 9 provided with a deflectable flow sensor 10. The tip of this sensor 10 extends right up along the axis A to the axis A' into the passage 12 so that it can be deflected by flow therein as indicated by the dashed-line positions of the sensor tip 10. The tip 10 can be an electrical field-difference wire to determine flow volume, or may coact with magnetic detectors 37 that ascertain its position to determine flow volume or speed. It is carried in an axially open cleft or slot 40 of a cylindrical extension 30 of a connection plug 18 carried on the sensor body 9.

The sensor body 9 is provided around the sensor 10 with a sleeve 13 slidable on the extension 30 along the axis A between an outer or extended position in which it goes up to a level with and completely surrounds and protects the sensor 10, to a retracted position, as seen in FIGS. 1 and 2, in which it is retracted to expose the sensor 10. A spring 14 in the bore 15 receiving this sleeve 13 urges it into the extended position, but it is engageable with the valve body 2 in the mounted position of the sensor body 9 to push it back into the retracted position. Thus before mounting of the sensor body 9 on the device the sleeve 13 protects the sensor 10, but during screwing of the body 9 into the seat 8 this sleeve 13 is automatically pushed back to expose the delicate sensor 10. In addition this sleeve 13 is formed with a pair of axially extending and diametrally opposite grooves 16 into which pins 17 of the extension 35 fit to establish an exact angular orientation of the valve body 9 on the housing 1. These pins 17 also extend into the cleft 40. Only in the proper position can the arrangement be screwed together. The body 9 therefore is screwed into the seat 8 with the sensor, 10, sleeve 13, and plug 18 not rotating. Once the installation is complete a holding nut 18 is tightened down on the plug 18 to lock it in place on the sensor body 9.

A temperature transponder or probe 20 is also provided in the bore 15. A small-diameter passage 23 extends through the plug or plate 18 from the bottom of the bore 15 to a threaded seat 21 adapted to receive a standard pressure meter indicated schematically at 38. In addition the body 9 is formed with a small-diameter bleed or fill passage 23 which can be externally blocked by a screw 39. The housing 2 may similarly be formed with such a passage 42 closed by a screw 41 to allow bleeding of the device or even filling of it if desired.

It is possible as shown in FIG. 3 to screw a plug 25 formed with a blockable drain hole 26 to the seat 8. This can be done for units taken out of service, or during servicing so that flow can continue while the removed core is cleaned or otherwise serviced. In addition the assembly of FIG. 3 simply constitutes a ball-type cutoff valve that can easily be converted to use as a flow measurer according to this invention.

Figure 4:
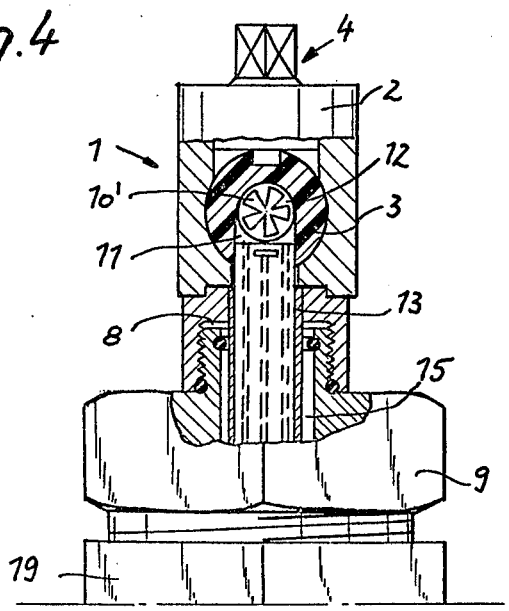
FIG. 4 is a view like FIG. 2 showing a variation on the valve of FIG. 1.

FIG. 4 shows how instead of a bendable sensor 10, a Woltmann-type sensor rotor 10' can be used. Such a wheel 10' is connected to a tachometer whose output is proportional to flow speed.

In FIG. 5 a valve housing 27 has a main passage 28 that can be blocked like a slide valve by a piston 29 formed with a passage 31 alignable in one position of the piston 29 with the passage 28. This piston 29 is formed with the branch passage 11 acommodating the sensor 10. It could also have a second passage like the passage 31 and aligned with the main passage 28 to permit flow even in the position of FIG. 5, that is while the sensor 10 can be serviced.

It is also possible as seen in FIG. 6 to mount a valve seat 5 and rotary valve body 3 in a plate-type housing 32 that can be bolted to an appropriate piece of process equipment.

The system according to this invention therefore allows all the working parts of the apparatus to be changed without emptying the system. In fact the system need not even be depressurized. The valve body is moved in to the blocking position, in which the seat 5 completely seals off the ends of the passage 12, so that the screw 39 can be loosened to depressurize the passage 12 and 15. Then the parts needing servicing can be withdrawn and replaced. Once this is complete the valve is opened and, after all air is driven out of the interior of the device, the screw 39 is driven home. Obviously the servicing can be done very rapidly. The sensor acts as a standard cutoff valve and can therefore eliminate the need for such an element in addition to itself.

I claim:

1. An apparatus for measuing at least one parameter of a fluid flowing between two conduit sections, said apparatus comprising:
    a housing connected between said sections and having a throughgoing main passage communicating therebetween and an externally open branch passsage extending from said main passage between said sections, said housing being formed at the junction of said main branch passages with a valve seat;
    a valve body on said seat formed with a throughgoing and at least generally T-shaped valve passage having a pair of arm sections alignable with said main passage and a leg section aligned with said branch passage,
    means for displacing said body relative to said main passage at said seat between a flow position in which said valve passage is aligned with said main passage and said fluid can flow through said main passage between said sections and a blocking position in which said valve passage is not aligned with said main passage and fluid cannot flow through said main passage between said sections, said valve seat sealing said valve passage from said main passage in said blocking position
    a sensor for said one parameter extending through said branch passage into said valve passage; and
    means for releasably securing said sensor to said housing and for externally sealing said branch passage.

2. The measuring apparatus defined in claim 1, further comprising a plug releasably securable to said housing over said branch passage to block same.

3. The measuring apparatus defined in claim 1 wherein said valve body is slidable between said flow and blocking positions.

4. The measuring apparatus defined in claim 1 wherein said main passsage and said arm sections are straight, aligned, and of substantially the same inside diameter, whereby in said flow position said valve body presents virtually no restriction to flow through said housing.

5. The measuring apparatus defined in claim 4 wherein said sensor has a tip lying at the junction of said arm and leg sections and aligned with said main passage in said flow position of said valve body, said tip being deflectable by flow over it between said conduit sections.

6. The measuring apparatus defined in claim 5 wherein said tip is deflectable in a direction parallel to said main passage by flow through said arm sections, said sensor including means of detecting the extent of deflection of said tip by said flow for determining the rate of flow through said valve body.

7. The measuring apparatus defined in claim 6 wherein said sensor body has:
    a protective sleeve displaceable between an extended position surrounding and protecting said tip and a retracted position exposing said tip; and
    biasing means for urging said sleeve into said extended position, said sleeve being forced into said retracted position when said sensor body is held by said securing means to said housing.

8. The measuring apparatus defined in claim 7 wherein said sleeve is slidable in said sensor body and said biasing means is a spring braced between said sleeve and said sensor body.

9. The measuring apparatus defined in claim 7 wherein said sleeve has a formation extending in the direction of displacment of said sleeve, said housing being provided with another formation engageable with said formation of said sleeve only in a single angular orientation of said tip relative to said main passage.

10. The measuring apparatus defined in claim 9 wherein said formation of said sleeve is a groove and said formation of said housing is a pin engageble in said groove.

11. The measuring apparatus defined in claim 5 wherein said tip is a fan-type rotor rotatably deflectable about a fan axis aligned with said main passage, said sensor including means for detecting the rotation rate of said rotor for determining the rate of flow through said valve body.

12. The measuring apparatus defined in claim 5 wherein said sensor has a sensor body held by the securing means to said housing, said tip projecting from said sensor body and being deflectable by flow through said main passage and arm sections.

13. The measuring apparatus defined in claim 5 wherein said sensor body is formed with a small-diameter externally open bleed line and is provided with a screw sealingly engageable with said line to close same.

14. The measuring apparatus defined in claim 13 wherein said transverse axis is generally perpendicular to said main passage and said branch passage is at least generally centered on said transverse axis.

15. The measuring apparatus defined in claim 5 wherein said sensor body is provided with a seat and is formed with an auxiliary passage extending between said seat and said valve passage, said apparatus further comprising another sensor secured to said sensor body in said seat.

16. The measuring apparaus defined in claim 15 wherein said other sensor is a pressure meter.

17. The measuring apparatus defined in claim 15 wherein said other sensor is a temperature meter.

18. The measuring apparatus defined in claim 4 wherein said valve body and seat are complementarily formed and are centered on a transverse axis transverse to said main passage, said valve body being pivotal about said transverse axis between said positions.

19. The measuring apparatus defined in claim 1 wherein said securing means includes a screwthread on said housing.

20. The measuring apparatus defined in claim 19 wherein said securing means includes a nut engageable with said screwthread and with said sensor.

* * * * *